United States Patent
Buck et al.

(10) Patent No.: US 9,317,290 B2
(45) Date of Patent: Apr. 19, 2016

(54) EXPRESSING PARALLEL EXECUTION RELATIONSHIPS IN A SEQUENTIAL PROGRAMMING LANGUAGE

(71) Applicant: NVIDIA Corporation, Santa Clara, CA (US)

(72) Inventors: Ian A. Buck, San Jose, CA (US); Bastiaan Aarts, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 337 days.

(21) Appl. No.: 13/735,438

(22) Filed: Jan. 7, 2013

(65) Prior Publication Data

US 2013/0283015 A1    Oct. 24, 2013

Related U.S. Application Data

(63) Continuation of application No. 12/114,829, filed on May 5, 2008, now abandoned.

(60) Provisional application No. 60/915,930, filed on May 4, 2007.

(51) Int. Cl.
    *G06F 9/38*    (2006.01)
    *G06F 9/52*    (2006.01)

(52) U.S. Cl.
    CPC . *G06F 9/38* (2013.01); *G06F 9/522* (2013.01)

(58) Field of Classification Search
    CPC combination set(s) only.
    See application file for complete search history.

(56) References Cited

U.S. PATENT DOCUMENTS

| | | | |
|---|---|---|---|
| 4,873,626 A | 10/1989 | Gifford | |
| 5,442,758 A | 8/1995 | Slingwine et al. | |
| 5,664,214 A * | 9/1997 | Taylor et al. | 712/20 |
| 5,812,811 A | 9/1998 | Dubey et al. | |
| 6,266,745 B1 | 7/2001 | de Backer et al. | |
| 6,327,607 B1 * | 12/2001 | Fant | 709/201 |
| 6,487,580 B1 * | 11/2002 | Bobak et al. | 718/106 |
| 6,950,927 B1 * | 9/2005 | Apisdorf et al. | 712/216 |
| 7,100,164 B1 * | 8/2006 | Edwards | G06F 8/433 717/136 |
| 7,324,112 B1 * | 1/2008 | Lindholm et al. | 345/522 |
| 7,490,218 B2 | 2/2009 | Eggers et al. | |
| 7,526,634 B1 | 4/2009 | Duluk, Jr. et al. | |
| 7,574,439 B2 * | 8/2009 | Everhart et al. | 1/1 |

(Continued)

OTHER PUBLICATIONS

Non-Final Office Action mailed on Jun. 3, 2011 for U.S. Appl. No. 12/114,829, 9 pages.

(Continued)

*Primary Examiner* — Eric Coleman
(74) *Attorney, Agent, or Firm* — Artegis Law Group, LLP

(57) ABSTRACT

Circuits, methods, and apparatus that provide parallel execution relationships to be included in a function call or other appropriate portion of a command or instruction in a sequential programming language. One example provides a token-based method of expressing parallel execution relationships. Each process that can be executed in parallel is given a separate token. Later processes that depend on earlier processes wait to receive the appropriate token before being executed. In another example, counters are used in place to tokens to determine when a process is completed. Each function is a number of individual functions or threads, where each thread performs the same operation on a different piece of data. A counter is used to track the number of threads that have been executed. When each thread in the function has been executed, a later function that relies on data generated by the earlier function may be executed.

16 Claims, 7 Drawing Sheets

(56) References Cited

U.S. PATENT DOCUMENTS

| | | | |
|---|---|---|---|
| 7,617,384 B1 * | 11/2009 | Coon et al. | 712/220 |
| 7,945,911 B1 | 5/2011 | Garthwaite | |
| 8,291,431 B2 * | 10/2012 | Du et al. | 718/106 |
| 2002/0010732 A1 * | 1/2002 | Matsui et al. | 709/107 |
| 2003/0169259 A1 * | 9/2003 | Lavelle et al. | 345/501 |
| 2003/0195785 A1 * | 10/2003 | Thalangara et al. | 705/8 |
| 2006/0101466 A1 * | 5/2006 | Kawachiya et al. | 718/100 |
| 2006/0179429 A1 | 8/2006 | Eggers et al. | |
| 2007/0067770 A1 | 3/2007 | Thomasson | |
| 2007/0091102 A1 * | 4/2007 | Brothers et al. | 345/506 |
| 2011/0078511 A1 * | 3/2011 | Sinha | G06F 11/3604 714/38.1 |

OTHER PUBLICATIONS

Non-Final Office Action mailed on Oct. 19, 2011 for U.S. Appl. No. 12/114,829, 11 pages.

Final Office Action mailed on Mar. 5, 2012 for U.S. Appl. No. 12/114,829, 12 pages.

* cited by examiner

EXPRESSING PARALLEL EXECUTION RELATIONSHIPS IN A SEQUENTIAL PROGRAMMING LANGUAGE

CROSS-REFERENCES TO RELATED APPLICATIONS

This application is a continuation of U.S. patent application Ser. No. 12/114,829, filed May 5, 2008, and claims the benefit of U.S. provisional application No. 60/915,930, filed May 4, 2007, which are incorporated by reference.

BACKGROUND

The present invention generally relates to instructions used in sequential programming languages, and more particularly to instructions that include information regarding parallel execution relationships.

The demand for increased realism in computer graphics for games and other applications has been steady for some time now and shows no signs of abating. This has placed stringent performance requirements on computer system components, particularly graphics processing units. For example, to generate improved images, an ever increasing amount of data needs to be processed by a graphics processing unit. In fact, so much graphics data now needs to be processed that conventional processing techniques are not up to the task and need to be replaced.

Fortunately, the engineers at NVIDIA Corporation in Santa Clara, Calif. have developed a new type of processing circuit that is capable of meeting these incredible demands. This amazing new circuit is based on the concept of multiple single-instruction multiple-data processors.

These new processors have such an extensive capacity, allowing them to execute so many processes at the same time, that it has become difficult to keep them fully occupied. In particular, it is now desirable to be able to concurrently execute multiple tasks, that is, to execute two or more tasks at the same time, instead of waiting for one to complete then starting the next.

This graphics data is typically processed under the control of commands or instructions in a programming language such as C or C++. These languages are serial in nature, that is, an instruction to perform a first task is followed by an instruction to perform a second task. This makes it difficult to inform these newly developed processors that two or more processes can be executed in parallel.

Accordingly, what is needed are circuits, methods, and apparatus that allow parallel execution relationships to be expressed in commands or instructions in a sequential programming language.

SUMMARY

Accordingly, embodiments of the present invention provide circuits, methods, and apparatus that allow parallel execution relationships to be included in a function call or other appropriate portion of a command or instruction in a sequential programming language.

An exemplary embodiment of the present invention provides a token-based method of expressing parallel execution relationships. Each process that can be executed in parallel is given a separate token. Later processes that depend on earlier processes wait to receive the appropriate token or tokens before being executed.

In a specific example, a first and a second function may be executed in parallel before a third function is executed, where the third function relies on data generated by the first and second functions. The first function may be called, where the call includes a first token, and the second function may be called, where that call includes a second token. The third function may then be called, where the third function does not begin execution until it receives the first token at the completion of the first function and the second token at the completion of the second function. The first and second functions may be executed simultaneously, their execution may overlap, they may be executed at least partially concurrently, or they may be run at different times. In this way, the first and second functions may be executed in parallel and before the third function is executed.

In another exemplary embodiment of the present invention, counters are used instead of tokens to determine when a process is completed. In this embodiment, each function is a number of individual functions or threads, where each thread performs the same operation or instruction on a different piece of data. A counter is used to track the number of threads that have been executed. When each thread in the function has been executed, the function is complete, and a later function that relies on data generated by the earlier function may be executed.

In a specific example, a first function is to be executed a first number of times and a second function is to be executed a second number of times. The call for the first function can specify the first number and the call for the second function can specify the second number. The call for the first function may also specify a first counter and the call for the second function may specify a second counter. A first counter tracks the number of times the first function is executed while a second counter tracks the number of times the second function is executed. A third function, dependent on results from the first and second functions, waits until the first counter reaches the first number and the second counter reaches the second number before it is executed. In this way, the first function and second function can be executed at least partially concurrently.

These processes may be executed on a processor including one or more single-instruction multiple-data processors. These processors may be cumulatively referred to as a processor core. They may be general purpose in nature, capable of handling different types of graphics data such as geometry, vertex, and pixel data, as well as other computing functions, such as those that may be provided by a central processing unit. Alternately, these processors may be more specific in nature, tailored to execute specific functions. The processors can store data in a memory, such as an on-chip, local memory, system memory, or other memory. The geometry, vertex, pixel, or other data may be displayed or used to generate data for display, for example on a monitor.

Various embodiments of the present invention may incorporate one or more of these or the other features described herein. A better understanding of the nature and advantages of the present invention may be gained with reference to the following detailed description and the accompanying drawings.

DESCRIPTION OF EXEMPLARY EMBODIMENTS

Figure 1:
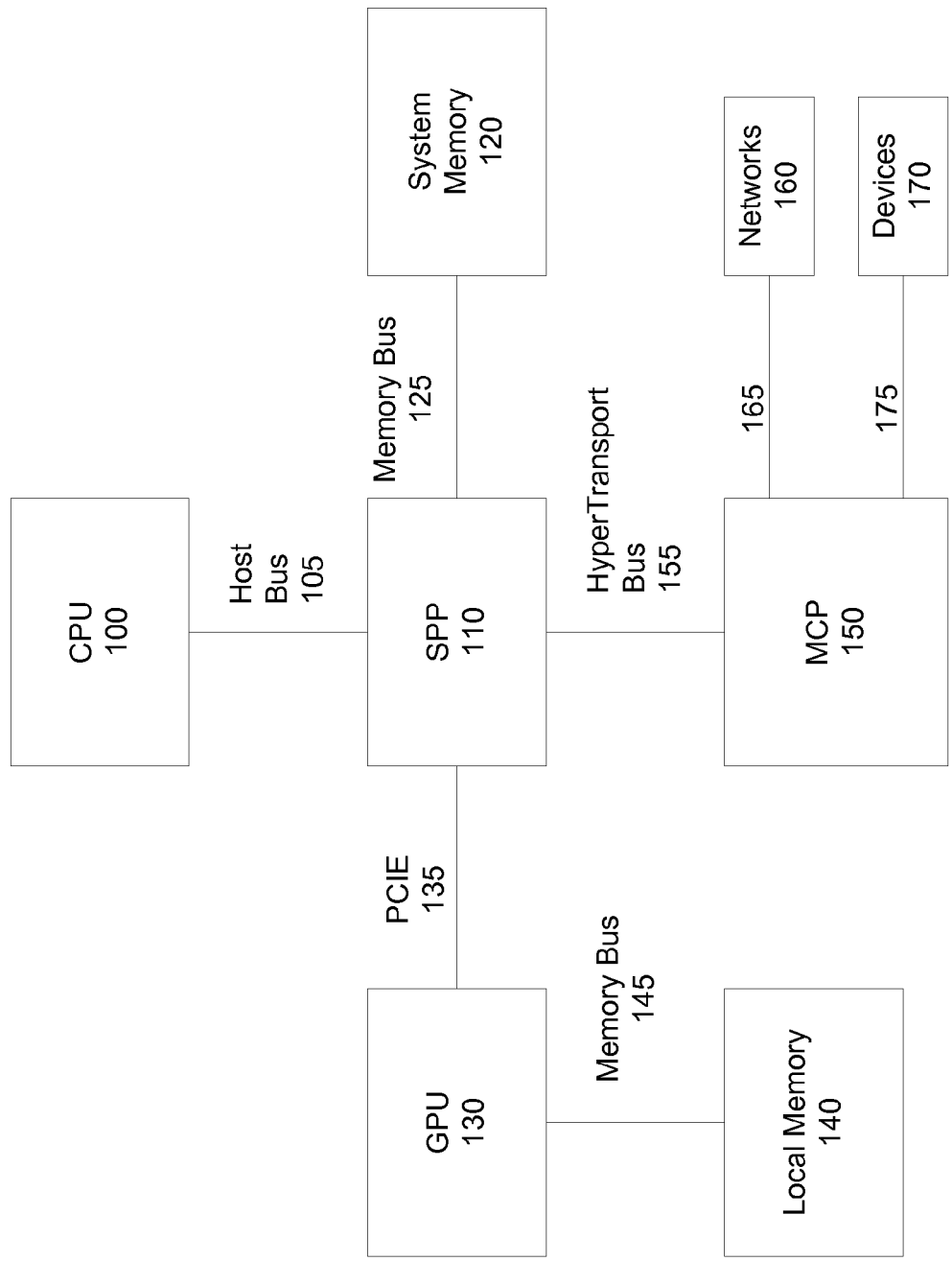
FIG. 1 is a block diagram of a computer system that is improved by the incorporation of an embodiment of the present invention.

FIG. 1 is a block diagram of a computing system that is improved by incorporating an embodiment of the present invention. This block diagram includes a central processing unit (CPU) 100 or host processor, system platform processor (SPP) 110, system memory 120, graphics processing unit (GPU) 130, local memory 140, media communications processor (MCP) 150, networks 160, and internal and peripheral devices 170. This figure, as with the other included figures, is shown for illustrative purposes only, and does not limit either the possible embodiments of the present invention or the claims.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection such as a Hyper-Transport bus 155, and connects network 160 and internal and peripheral devices 170 to the remainder of the computer system. The graphics processing unit 130 receives data over the PCIE connection 135 and generates graphic and video images for display over a monitor or other display device (not shown). The graphics processing unit 130 stores pixel and other graphics data in the local memory 140.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. This technology, the pioneering SLI™, has been developed by NVIDIA Corporation. In other embodiments of the present invention, one or more GPUs may be located on one or more graphics cards, while one or more others are located on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention. While embodiments of the present invention are well suited to graphics processing units, other types of graphics processors, as well as other processors, may benefit from the incorporation of an embodiment of the present invention. For example, multi or general-purpose processors, or other processors, such as integrated graphics processors or general purpose graphics processing units, may benefit from the incorporation of an embodiment of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Embodiments of the present invention may be used to improve the processing on devices such as the CPU 100, SPP 110, GPU 130, MCP 150, or other device. The processor executing commands according to embodiments of the present invention may store data in memories such as the system memory 120, local memory 140, on-chip memory (not shown), or other memory. Data processed according to embodiments of the present invention may be displayed using a display (not shown) coupled to the GPU 130, or other display or monitor device. Also, data processed according to embodiments of the present invention may be used to generate display data that is displayed using a display (not shown) coupled to the GPU 130, or other display or monitor device.

Processes that are executed on these devices, such as the graphics processing unit 130, are typically controlled or directed using a sequential programming language, such as C, C+, or C++. These languages are referred to as sequential languages because commands are provided in a serial or sequential fashion. For example, an instruction to execute function f may be followed by a command to execute function g.

But again, graphics processing units and other circuits being developed by NVIDIA are capable of processing tremendous amounts of data. If functions are executed in the order received, for example function f is executed then function g is executed, the capacity of the processing circuits may not be fully utilized.

Accordingly, in instances where the execution of function g does not depend on the completion of function f, the two functions f and g may be processed at the same time, that is, the two processes may be executed in parallel. In this way, if excess processing capacity exists while function f is being executed, function g can also be executed, thereby more fully utilizing the tremendous amount of available processing capacity on the NVIDIA device. Accordingly, embodiments of the present invention provide circuits, methods, and apparatus that allow these processes to be executed in parallel, even though the instructions to execute them are provided in series by a sequential language.

One such embodiment of the present invention employs the use of tokens that are passed from one function to another. Each process that may be executed in parallel with another process is given a separate, identifiable token. These tokens typically have two states, which may be referred to as busy and free. When a function begins, it marks its token as busy, and when the function is completed, it marks its token as free. These tokens may then be passed to subsequent functions. For example, a function that depends on a predecessor function for a result may be required to wait to receive a token from that predecessor function. A simple example showing the use of these tokens follows.

Figure 2:
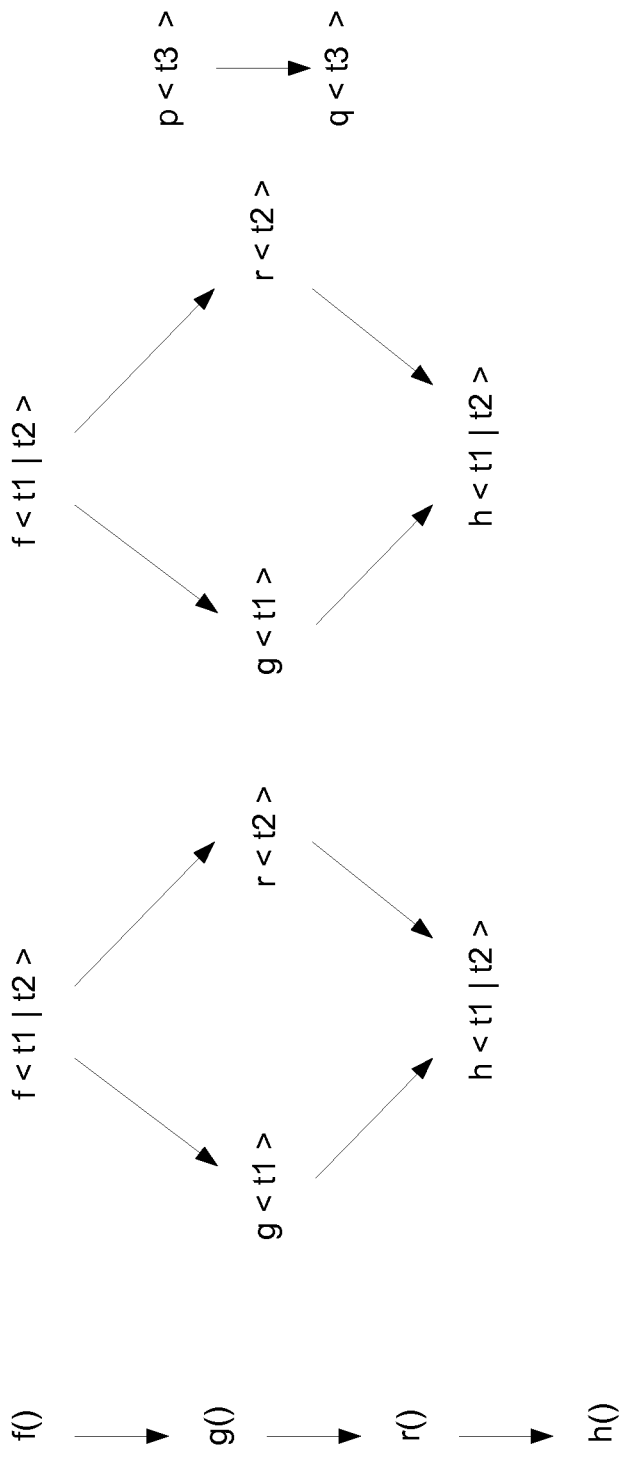
FIGS. 2A-2C illustrate the use of tokens to express parallel relationships according to an embodiment of the present invention.

FIGS. 2A-2C illustrate the use of tokens to express parallel relationships according to an embodiment of the present invention. FIG. 2A illustrates a conventional system where tokens are not used. Sequential commands are provided instructing function f to be executed, followed by g, r, and then h. These functions may then be processed sequentially. However, if two functions, for example g and r can be processed in parallel, computing capacity may be wasted if functions g and r are instead processed sequentially. Accordingly, it is desirable to execute functions g and r concurrently or in parallel.

Tokens are used in FIG. 2B to allow g and r to be executed in parallel. In this specific example, function f is called. The call for function f includes two tokens, T1 and T2. When function f completes, it passes these tokens to functions g and r.

Functions g and r, having separate individual tokens, may be executed in parallel. In practical circumstances, one function may begin execution earlier than the other, and one may complete execution before the other. Often these functions will overlap during some portion of the execution, though in some circumstances they may not overlap at all. For example, function r may begin before function g, and function r may execute very quickly, thus completing before function g even begins.

The call for function h identifies tokens T1 and T2. Accordingly, function h waits to receive tokens T1 at the completion of the execution of function g, and waits to receive token T2 at the completion of the execution of function r. When function h has received these tokens from functions g and r, function h may be executed on the processing circuit.

FIG. 2C illustrates an example where other processes are run in parallel using other tokens. Specifically, in this example, function p passes token T3 to function q at the conclusion of function p. These functions are in parallel and thus use a different token than processes f, g, r, and h.

While the examples shown are simple in nature for explanatory purposes, more complex branching structures can be implemented using techniques provided by embodiments of the present invention. In a practical circuit, it is the number of circuits that are available to track tokens or other parameters that limits the number of possible parallel operations.

Figure 3:
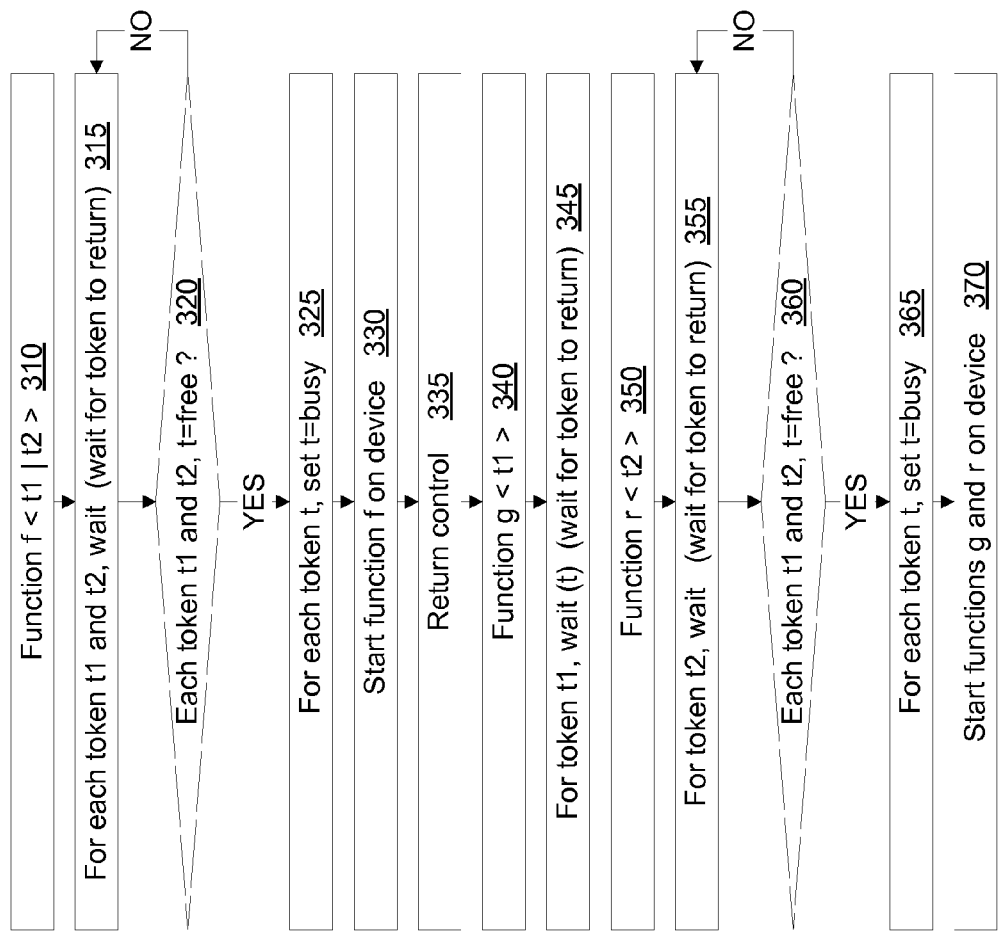
FIG. 3 illustrates a flowchart of a method of using tokens to express parallel relationships according to an embodiment of the present invention.

FIG. 3 illustrates a flowchart of a method of using tokens to express parallel relationships according to an embodiment of the present invention. In this method, different tokens are given to functions that may be performed in parallel, and subsequent functions that depend on predecessor functions for results wait to receive tokens from those predecessor functions before being executed.

Specifically, in act 310, function f is called. This function call identifies tokens T1 and T2. Accordingly, function f should not begin until these tokens are free. Also, function f can pass these tokens to other processes once function f is completed. In act 315, the processor is instructed to wait until tokens T1 and T2 are returned or free. In some embodiments of the present invention, this command is not necessary as it is implied by the function call.

In act 320, it is determined whether each token T1 and T2 is free. If not, the processor continues to wait. If both tokens are free, then both tokens can be set to busy in act 325, and function f can be started on the device in act 330. Control can be returned to the user in act 335 or other appropriate time. In act 340, a call for function g is received. This function identifies token T1. Accordingly, function g should not begin execution until it receives token T1 from function f. This may be made explicit by instruction 345, which instructs the processor to wait for token T1. Again, this command may not be necessary depending on the exact implementation of the present invention. In act 350, function r is called. This call identifies token T2. Again, instruction 355 instructs the processor to wait for token T2 before starring function r.

In act 360, it is determined whether each token T1 and T2 is free, that is, whether function f completed. If not, the processor continues to wait. If so, then each token can be set to busy in act 365, and functions g and r can be started in parallel on the device in act 370.

In the above examples, one or more tokens are identified in each function call. Various embodiments of the present invention behave differently if a function call does not identify at least one token. For example, a default token may be assumed. Alternately, it may be assumed that all tokens are being used. In still other embodiments, it may be assumed that no tokens are being used. Often, the default condition is set such that processes are executed in a convention sequential manner.

In systems employing these tokens, it is desirable at various times to determine the current or present state of the tokens being used. Accordingly, embodiments of the present invention employ query and status commands for this purpose. Flowcharts illustrating the operation of these commands are shown in the following two figures.

Figure 4:
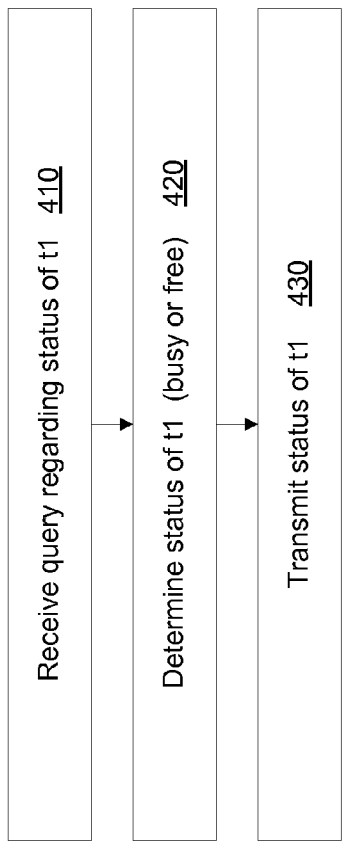
FIG. 4 illustrates a method of responding to a query according to an embodiment of the present invention.

FIG. 4 illustrates a method of responding to a query according to an embodiment of the present invention. In act 410, a query regarding the status of token T1 is received. In act 420, the status of T1, whether it is busy or free, is determined. In act 43, the status of token T1 is transmitted.

Figure 5:
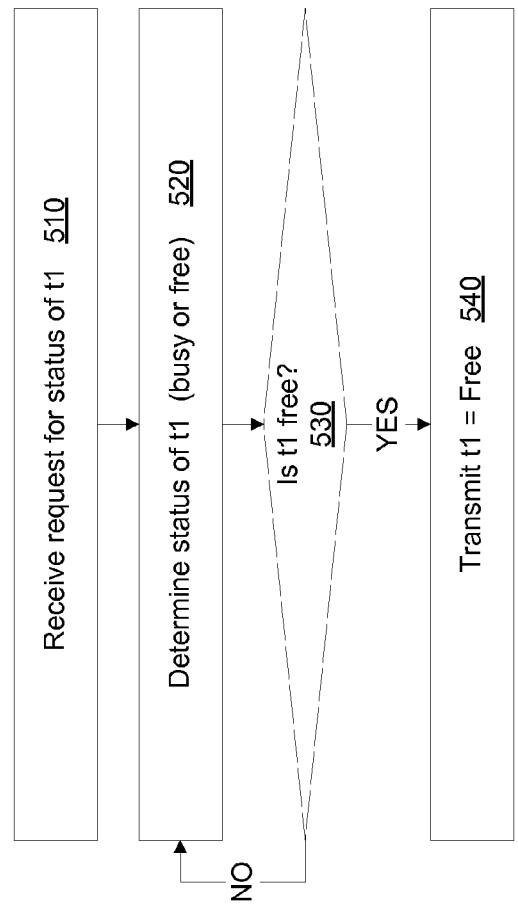
FIG. 5 illustrates a method of responding to a status command according to an embodiment of the present invention.

FIG. 5 illustrates a method of responding to a status command according to an embodiment of the present invention. In act 510, a request for the status of token T1 is received. In act 520, the status of T1, whether it is busy or free, is determined. If the token is determined as being free, an indication that it is free is transmitted in act 540. If T1 is not free, the status of token T1 can be checked again in act 520. When token T1 is free, that fact is transmitted, again in act 520.

In embodiment of the present invention, functions are executed using a single-instruction multiple-data processor. This means a single instruction is executed on several pieces of data. This is useful when the same function is being applied to a large set of data. For example, it may be desirable to increase the green level for each pixel being displayed on a screen. This can be done by reading color values for each pixel and adding to its green color component. In this example, one function call can initiate several processes, referred to as threads, where each thread corresponds to an operation on a subset of the pixels being displayed.

In various embodiments of the present invention, these threads may number into the hundreds or even thousands. Accordingly, it becomes very undesirable to track a token for each thread, since the result is hundreds or thousands of tokens. Accordingly, counters may be used instead of tokens.

When counters are employed, a function call may include the number of threads to be run. The function call may also identify a counter to be used. A specific embodiment of the present invention includes four counters, though other numbers of counters may be used. A counter can be incremented each time a thread is completed. When the counter reaches the number of threads to be run, the function is complete, and control of the counter can be passed to another function. In this way, control of counters can be used to identify parallel relationships instead of tokens. Examples are shown in the following figures.

Figure 6:
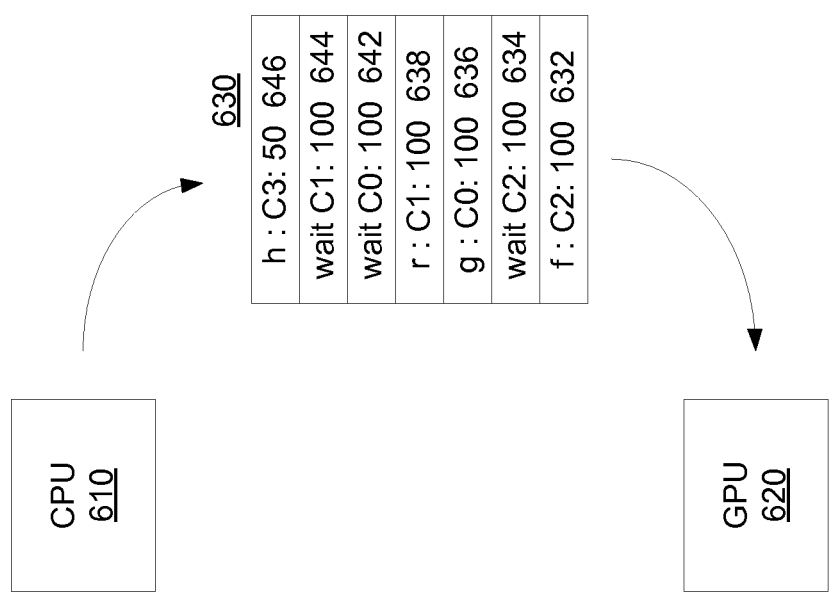
FIG. 6 illustrates an example of expressing parallel relationships using counters according to an embodiment of the present invention.

FIG. 6 illustrates an example of expressing parallel relationships using counters according to an embodiment of the present invention. This figure includes a central processing unit 610, a graphics processing unit 620, and a push buffer or command buffer 630. The push buffer 630 may be included in a memory, such as the system memory 120, local memory 140, or other appropriate memory.

In this example, commands are placed in the push buffer 630 by the central processing unit 610. The graphics processing unit 620 reads instructions from the push buffer 630. The push buffer 630 includes an instruction on line 632 to execute function f. This instruction identifies a counter C2 and further identifies the number of threads to be executed as 100. Line 634 includes an instruction for the processor to wait for the counter C2 to complete its count to 100. Following this are instructions to execute functions g and r. The call for function g includes an identification of counter C0 and the number of threads as 100, while the function call for r includes identifies counter C1 and the number of threads as 100. Line 642 instructs the GPU to wait for C0 to reach its count, while line 644 instructs the GPU 620 to wait for the counter C1 to reach its count. Once these counters are both free, function h is to be executed. The call for function h identifies counter C3 and the number of threads as 100.

Accordingly, function f is executed first. Once all 100 of its threads are completed, counter C2 has a value of 100. Accordingly, functions g and r can be executed, and in this example, they may be executed in parallel. Once these functions are complete, counters C1 and C0 each have a value of 100, and function h is allowed to proceed. The operation of the four counters in this example is shown in the following figure.

Figure 7:
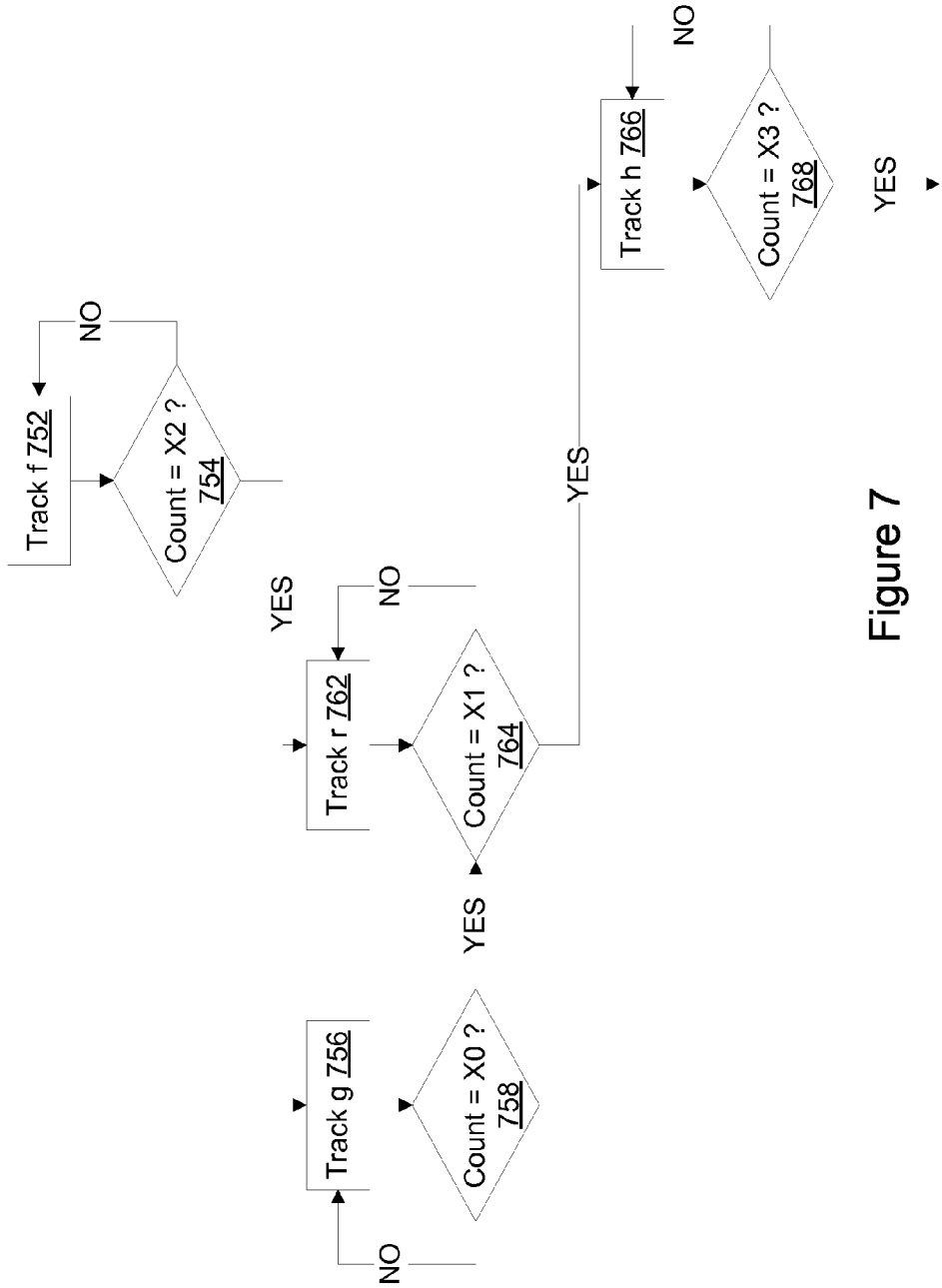
FIG. 7 illustrates the operation of counters used in expressing parallel relationships according to an embodiment of the present invention.

FIG. 7 illustrates the operation of counters used in expressing parallel relationships according to an embodiment of the present invention. This figure illustrates the operation of counters C0 710, C1 720, C2 730, and C3 740 in the diagram of FIG. 6.

Again, the first process to be executed is function f. Accordingly counter C2 tracks the number of completed threads in act 752. In act 754, it is determined whether the count has reached a value, referred to here as X2. This value was 100 for explanatory purposes in FIG. 6. If the counter has yet to reach this value, the completion of threads continues to be tracked in act 752. Once the counter reaches this value, function g and r are executed, counter C0 710 tracks completed threads for function g in act 756, and counter C1 720 tracks the completed threads of function r in act 762.

In acts 758 and 764, it is determined whether counters C0 710 and C1 720 have both reached their predetermined values. If they have not, then one or both of the functions g and r continue to be tracked. When both counters have reached their predetermined values, that is, a value that corresponds to the number of threads to be completed, function h is started. Completed threads of function h are tracked act 766. In act 768, it is determined whether the counter C3 740 has reached its predetermined value. If it has, other functions that are not shown may proceed. If it has not, counter C3 740 continues to track completed threads of function h.

In the example of FIG. 6, separate counters tracked the completion of threads for functions g and r. However, in some embodiments of the present invention, it is not important to track each individual function; only information regarding the total number of completed threads for multiple processes being executed in parallel is needed. For example, if g and r each include 100 threads, it is only necessary to know that 200 threads of g and r have been completed to know that both functions are done. Accordingly, one counter can be used to track both functions. When the count reaches 200, it is known that functions g and r are complete and function h can begin. An example of this is shown in the following figure.

Figure 8:
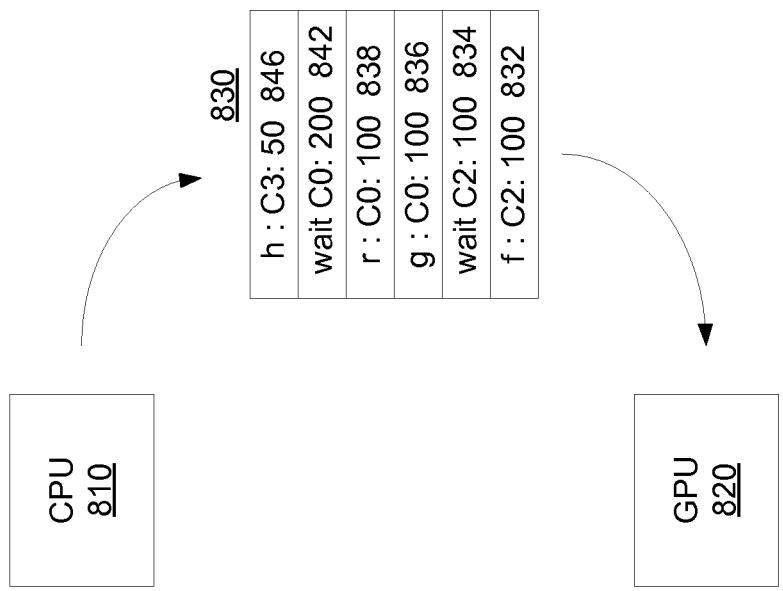
FIG. 8 illustrates an example of expressing parallel relationships using counters according to an embodiment of the present invention.

FIG. 8 illustrates an example of expressing parallel relationships using counters according to an embodiment of the present invention. This figure includes a central processing unit 810, a graphics processing unit 820, and a push buffer 830. The push buffer 830 may be included in a memory, such as the system memory 120, local memory 140, or other appropriate memory.

In this example, commands are placed in the push buffer 630 by the central processing unit 810. The graphics processing unit 820 reads instructions from the push buffer 830. The push buffer 830 includes on line 832 an instruction to execute function f. This instruction identifies a counter C2 and further identifies the number of threads to be executed as 100. Line 834 is an instruction to wait for the counter C2 to complete its count to 100. Following this are instructions to execute functions g and r, lines 836 and 838. The call for function g includes an identification of counter C0 and the number of threads as being 100, while the function call for r also identifies counter C0 and the number of threads as being 100. Line 842 instructs the GPU to wait for C0 to reach a count of 200, the total number of threads in functions g and r. Once this counter has reached this count, function h is to be executed. The call for function h identifies counter C3 and the number of threads as 100.

Accordingly, function f is executed first. Once all 100 of its threads are completed, counter C2 has a value of 100 and functions g and r can be executed in parallel. Once these functions are both complete, counter C0 has a value of 200, and function h proceeds.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of processing data comprising:
 receiving a first command instructing a first process to be executed on a processing circuit, the first command including a first indication that may be used to indicate when the first process has completed execution;
 receiving a second command instructing a second process to be executed on the processing circuit, the second command including a second indication that may be used to indicate when the second process has completed execution;

receiving a third command instructing a third process to be executed on the processing circuit, the third command instructing the third process not to begin until the first indication and the second indication have been received, wherein data generated by the third process is stored in a memory, and wherein the first command, the second command, and the third command are compatible with a sequential programming language.

2. The method of claim 1 wherein the first indication is a token.

3. The method of claim 1 wherein the first indication is a count provided by a counter.

4. The method of claim 1 wherein the first command is compatible with a C++ programming language.

5. The method of claim 1 wherein the processing circuit comprises a single-instruction multiple-data processor.

6. The method of claim 1 wherein the processing circuit comprises a plurality of single-instruction multiple-data processors.

7. The method of claim 1 further comprising:
receiving one or more commands to use the stored data to generate display data and to display the display data.

8. An integrated circuit comprising:
a processing circuit capable of executing at least a first and a second process;
a first counter configured to track a number of times the first process has been executed on the processing circuit;
a second counter configured to track a number of times the second process has been executed on the processing circuit; and
a memory interface circuit to receive a plurality of instructions from a command buffer in a memory,
wherein one of the plurality of instructions prevent execution of a third process until the first counter reaches a first number and the second counter reaches a second number, and
wherein the plurality of instructions are compatible with a sequential programming language.

9. The integrated circuit of claim 8 wherein the plurality of instructions are compatible with a C++ programming language.

10. The integrated circuit of claim 8 wherein the processing circuit comprises a single-instruction multiple-data processor.

11. The integrated circuit of claim 8 wherein the processing circuit comprises a plurality of single-instruction multiple-data processors.

12. The integrated circuit of claim 11 wherein the integrated circuit is a graphics processing integrated circuit.

13. A method of processing data comprising:
receiving a first command to execute a first process a first number of times on a processing circuit;
receiving a second command to execute a second process a second number of times on the processing circuit;
tracking a number of times the first process has been executed on the processing circuit;
tracking a number of times the second process has been executed on the processing circuit;
determining that the first process has been executed the first number of times on the processing circuit;
determining that the second process has been executed the second number of times on the processing circuit;
receiving a third command to execute, after the first process has been executed the first number of times and the second process has been executed the second number of times, a third process a third number of times on the processing circuit; and then
receiving one or more additional commands to use data generated by the third process to generate display data and to display the display data,
wherein the first, second, and third commands are compatible with a sequential programming language.

14. The method of claim 13 wherein the sequential programming language is a C based programming language.

15. The method of claim 13 wherein the sequential programming language is a C++ programming language.

16. The method of claim 13 wherein the processing circuit comprises a plurality of single-instruction multiple-data processors.

* * * * *